Oct. 6, 1931.    F. H. LANDRUM    1,825,699
MEANS FOR TESTING SEALED CONTAINERS
Filed June 30, 1925    5 Sheets-Sheet 1

Oct. 6, 1931.    F. H. LANDRUM    1,825,699
MEANS FOR TESTING SEALED CONTAINERS
Filed June 30, 1925    5 Sheets-Sheet 2

Oct. 6, 1931.  F. H. LANDRUM  1,825,699
MEANS FOR TESTING SEALED CONTAINERS
Filed June 30, 1925   5 Sheets-Sheet 3

Inventor
Francis H Landrum
By O'Neill & Bunn
Attorneys

Oct. 6, 1931.  F. H. LANDRUM  1,825,699
MEANS FOR TESTING SEALED CONTAINERS
Filed June 30, 1925  5 Sheets-Sheet 4

Inventor
Francis H. Landrum
By O'Neill & Bunn
Attorneys

Oct. 6, 1931.    F. H. LANDRUM    1,825,699
MEANS FOR TESTING SEALED CONTAINERS
Filed June 30, 1925    5 Sheets-Sheet 5

Inventor
Francis H. Landrum
O'Neill T. Bunn
By
Attorneys

Patented Oct. 6, 1931

1,825,699

UNITED STATES PATENT OFFICE

FRANCIS H. LANDRUM, OF HONOLULU, TERRITORY OF HAWAII, ASSIGNOR TO HAWAIIAN PINEAPPLE COMPANY, LIMITED, OF HONOLULU, HAWAII, A CORPORATION OF HAWAII

MEANS FOR TESTING SEALED CONTAINERS

Application filed June 30, 1925. Serial No. 40,608.

The invention relates to means for and method of testing sealed containers of foodstuffs and other commodities to determine the fluid pressure or the degree of vacuum in said containers, in order that the containers in which the extent of vacuum is deficient may be separated from those having the necessary or desired degree of vacuum, the operation of the apparatus and the application of the method being predicated on the characteristic tendency of a flexible section of the container wall, usually the closure element, to bulge or convex outwardly, when the fluid pressure within the container exceeds the external pressure, as, for example, that of the atmosphere. The invention comprises means for applying a reduced fluid pressure to the exterior of a container or a portion of a container wall, which will bulge or move outward when the predominant pressure is on the inside of the container, and so regulating the reduction of the external pressure that the defective containers will be evidenced by the outward movement of the walls thereof, which movement is preferably communicated to a suitable indicating mechanism, the object being to enable the ready separation of containers having high internal pressure or deficiencies in the degrees of vacuum from those of low internal pressure or in which the desired degree of vacuum is maintained to insure preservation of the contents. The invention is applicable to any and all types of containers for various commodities, in which a vacuum or low fluid pressure is produced and maintained, which vaccum or reduced pressure results in a portion of the container wall being deformed or forced inwardly under normal or atmospheric pressure, the por tion of the container wall being "flipped" or convexed outwardly, when the pressure within the container exceeds that outside of the container. Obviously, therefore, the invention may be applied to the testing of the usual metal cans or tins containing foodstuffs or other commodities, bottles, jars or other containers involving closures which are capable of being flexed under the action of differential pressures within and without the receptacles, and, in fact, the invention is adapted to testing filled containers of various types and forms and of various materials so long as a wall or a portion of a wall of the container is susceptible of the flexing movement aforesaid.

The invention is illustrated in the accompanying drawings, in which.

Figure 1:
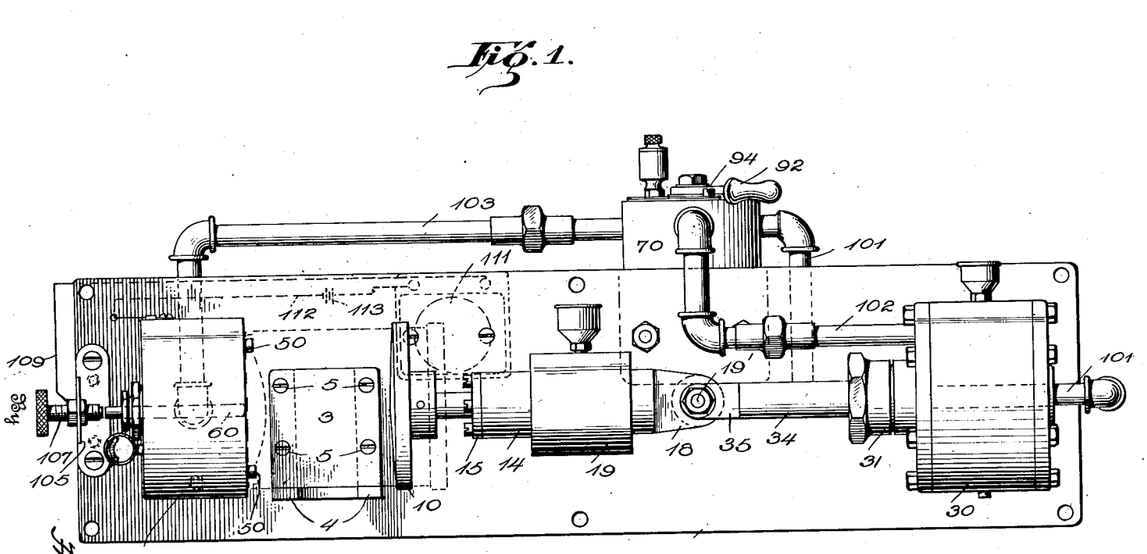
Fig. 1 is a front elevation of a simple form of apparatus for testing the individual cans.

Referring to the drawings, 1 indicates a panel or support upon which the apparatus is mounted, said panel or support being secured in vertical or upright position, as illustrated in Fig. 1, with the various elements of the mechanism secured to the front and rear faces of the panel. A bracket or shelf-like element 3, adapted to receive and initially support a receptacle while the latter is being moved into and out of testing relation, is attached to the front of the panel by suitable bolts and spacers 5—5, the horizontal element of the bracket preferably being forked, as at 4, to permit the receptacles to be manually inserted and removed with respect to the machine.

Mounted longitudinally of the panel is a reciprocatory plunger comprising a head or table element 10, which is pivotally connected by a cross pin 11 to the outer end of element 12 of a yielding pitman, the rear end 13 of the rod 12 being enlarged and telescopically mounted within the bore of the coordinate pitman member 14, which slides in a bushing 19 secured to the front of the panel by bolts 21 engaging the legs 20 of said bushing. The section 13 of rod 12 is held within the bore of member 14 by means of a collar 15 secured to the forward end of said member by bolts 16. A helical spring 17 mounted within the bore of member 14 serves to force the rod section 12 outwardly until the shoulder on section 13 of said rod engages the collar 15, the said spring being designed to yield under excessive pressure to prevent damage to the mechanism or to the containers being tested. The rear end of the yielding pitman is provided with an eye 18, which is connected by a bolt 19' with an eye 35 on the end of piston rod 34.

Mounted on the face of the panel 1 and spaced therefrom by suitable bolts and liners is a cylinder 30 having heads or enclosures 31 and 32, the head 31 carrying a suitable gland or stuffing box 33 constituting the packing means for the piston rod 34, which is connected with a suitable piston 36 reciprocable within the cylinder 30. The said cylinder and piston constitute a reciprocating motor for advancing the containers or receptacles to be tested to the vacuum chamber, and, obviously, said motor may be actuated by any suitable fluid pressure, but is preferably operated by connecting the ends of the cylinder alternately with a pressure reducing means, employed for testing the containers, and successively with the atmosphere, so that the piston is thereby reciprocated.

Figures 5, 6, 7, 8, 9:
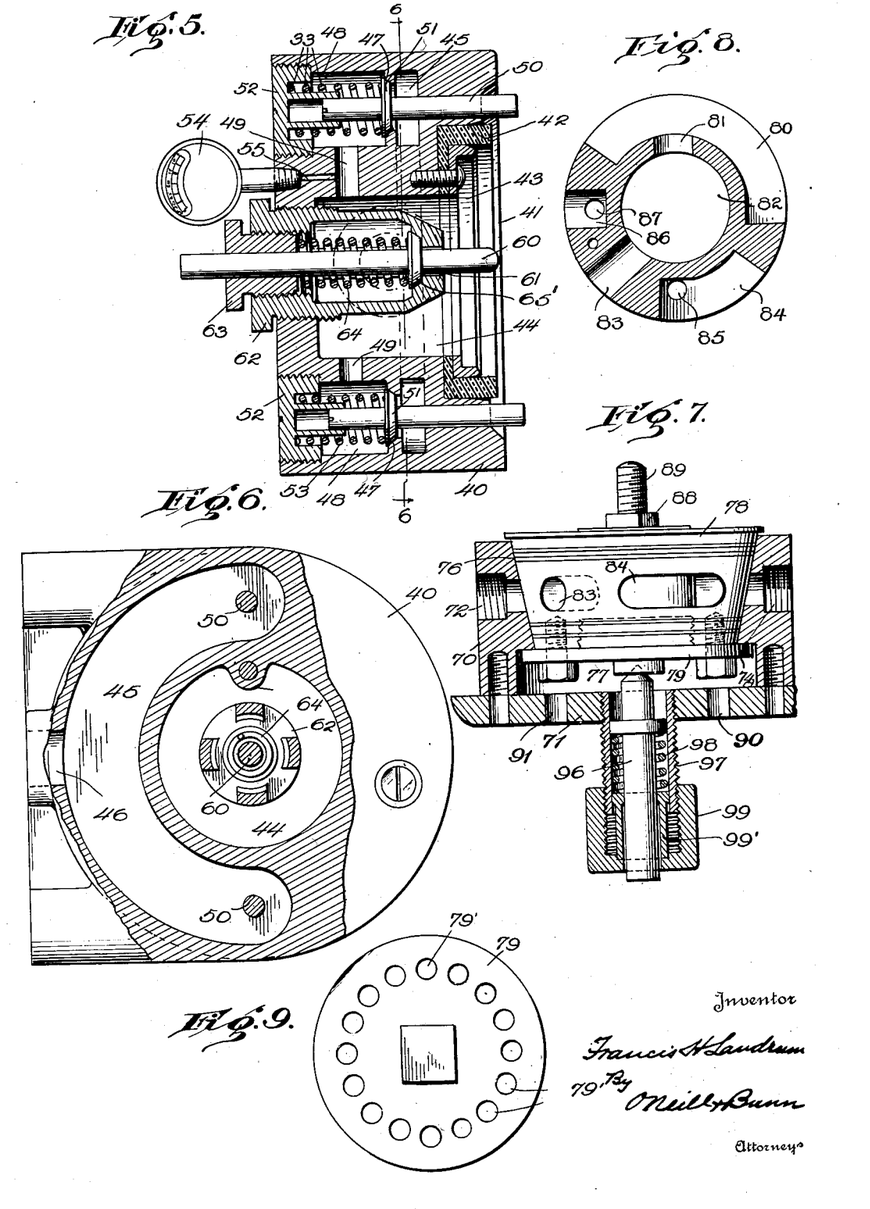
Fig. 5 is a sectional plan view of the vacuum chamber.
Fig. 6 is an end elevation, partly in section, of the vacuum chamber.
Figs. 7, 8 and 9 are detail views of the controlling valve employed with the apparatus.

Mounted on the opposite end of the panel is the vacuum chamber 40, which is preferably formed as a hollow casting, bolted to the face of the panel, said chamber having a central opening 44 bounded by an inwardly tapering rim 41, which will insure the accurate centering of the end of a given container with respect to the vacuum chamber, when said container is advanced toward the latter, as will be hereinafter explained. Mounted on an annular shoulder in the forward part of the vacuum chamber and concentric with the rim 41 is a sealing washer or gasket 42 of rubber or like material, which is locked firmly in position by a ring 43 bolted to the inner wall of the vacuum chamber. Formed within the body of the vacuum chamber, which latter is preferably made of a metal casting, is a semi-circular duct 45, which connects with an inlet nipple 46, as shown in Fig. 6. Also formed within the body of the cast chamber 40 are two valve chambers 48—48, which communicate with the respective ends of the duct 45 through ports surrounded by valve seats 47. Cooperating with the valve seats 47 are valves 51—51, each of which is provided with a stem 50 guided in a suitable opening in the front face of the chamber casting 40 and projects a slight distance beyond the said face of the chamber. The stem 50 extends on both sides of the corresponding valve, the end of the stem within the chamber being guided in a hollow central boss on an adjusting nut 52, which engages a threaded opening in alignment with the valve chamber 48. A helical spring 53 surrounds this end of the valve stem and is interposed between the nut 52 and the back of the valve 51 and serves to hold the latter firmly against its seat. Each of the valve chambers 48 is in communication with the central opening 44 of the vacuum chamber by ducts 49. Preferably a fluid pressure gauge 54 is mounted on the rear face of the vacuum chamber and communicates with one of the ducts 49 by means of a cross duct 55, as more particularly shown in Fig. 5.

Figures 2, 2A:
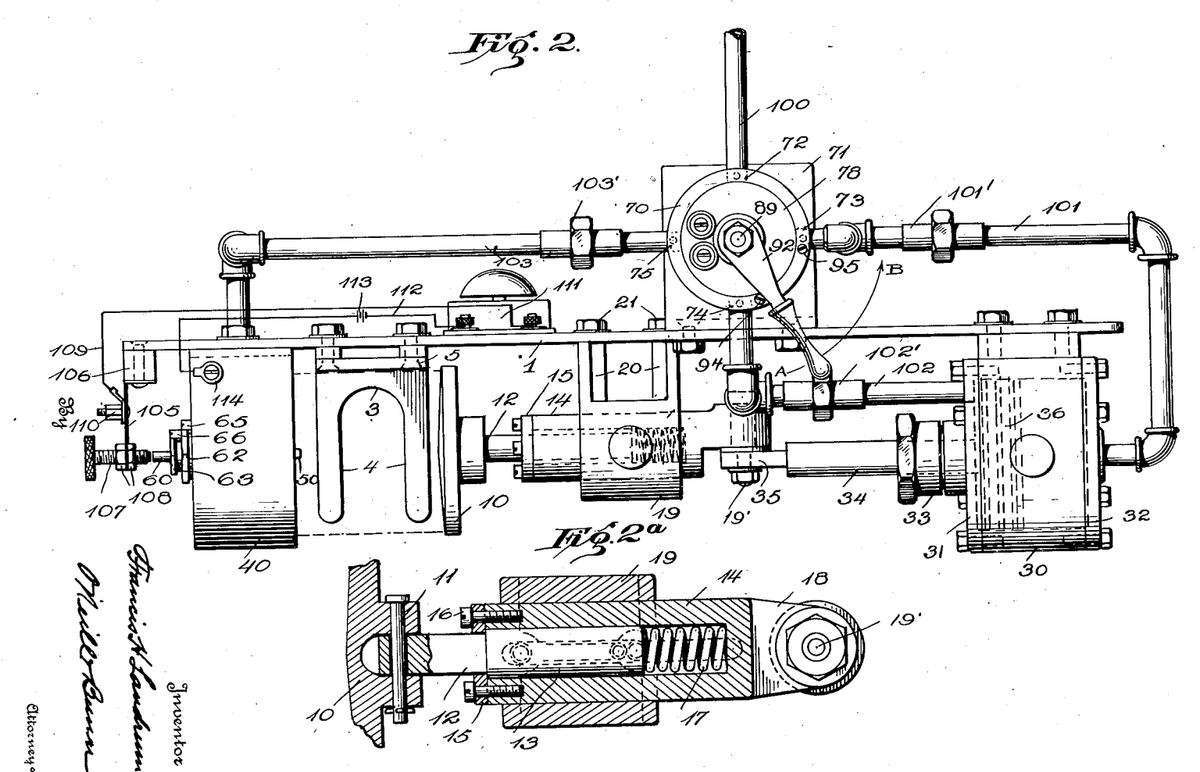
Fig. 2 is a plan view of the same.
Fig. 2a is a sectional elevation of a detail of the actuating plunger.
Figure 3:
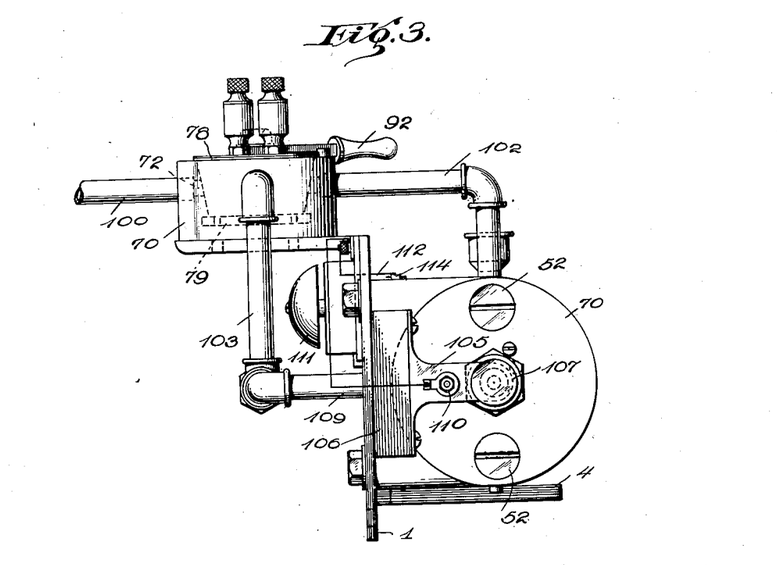
Fig. 3 is a right hand elevation.
Figure 4:
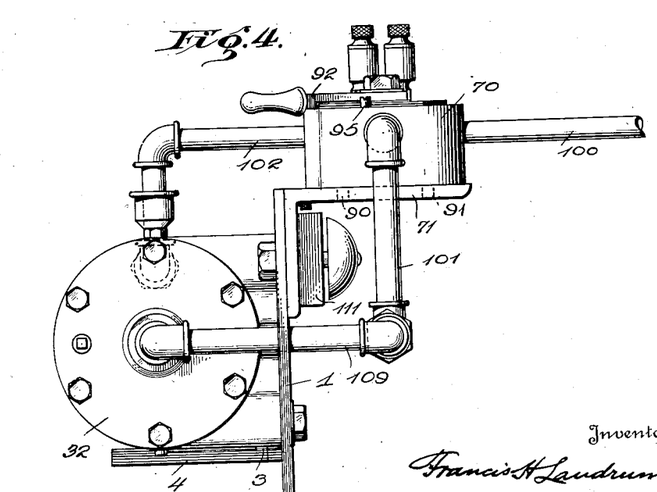
Fig. 4 is a left hand elevation.

Threaded in a central opening in the rear face of the vacuum chamber 40 is a cage 62, in which is mounted for reciprocatory movement a pin 60, the front end of which is guided in a suitable opening 61 in one end of the cage, the other end being guided in an adjusting nut 63 screw threaded into the opposite end of the cage and serving to regulate the pressure exerted by the helical spring 64 surrounding the pin 60 and confined between an abutment 65' on said pin and the inner end of the nut 63, said abutment 65' limiting the movement of the pin 60 toward the open face of the vacuum chamber. The relative position of the extreme end of the pin 60, with reference to the opening in the front face of the vacuum chamber, may be regulated by adjusting the cage 62 axially of the vacuum chamber, as will be understood. Both the cage 62 and the nut 63 may be locked in their adjusted positions by means of studs or bolts 65 and 66, respectively, as indicated in Fig. 2, thereby preventing the accidental displacement of the cage or the variation of the force exerted by spring 64 on the pin 60.

Mounted on a bracket 71, secured to the rear face of the panel 1, is a compound valve 70, which is designed to effect and control the reduction of the pressure in the vacuum chamber 40 and also to control the operation of the piston 36 in the cylinder 30, and, therefore, the movement of the plunger carrying the head or table 10, toward and from the vacuum chamber. Said valve comprises an annular casing provided with a tapered bore 76 to receive the valve plug 78, which is similarly tapered. The casing is provided with threaded ports 72, 73, 74 and 75 spaced at intervals of 90 degrees, into which are tapped the ends of pipes or conduits 100, 101, 102 and 103, respectively. The lower part of the valve casing is hollow to provide a chamber 77, which is in communication with the atmosphere through openings 90 and 91 in the bracket 71. The valve plug comprises a body portion having an arc-shaped port 80 in one lateral face thereof, a central hollow section 82 which has a port 81 connecting with port 80 and a second port 83 opening into the face of the plug generally opposite port 80, also an arc-shaped port 84 which is vented through the bottom of the valve plug through a port 85, and a radial port 86, which is similarly vented through the bottom of the valve through a port 87. In order to maintain a tight fit between the plug and the casing of the valve 70, the lower face of the valve plug is provided with a washer 79, having a screw threaded boss engaging a correspondingly threaded opening in the bottom of the plug, said washer having an annular series of vent openings 79′, which are adapted to be brought into registry with the ports 85 and 87 in the bottom of the plug for all of the different adjustments of the washer 79 with respect to the plug. By turning the washer 79 by means of the wrench head thereon to set up the screw threaded boss on the washer, with respect to the valve plug, it will be apparent that the edge of the washer which projects beyond the bottom of the plug, engaging the shoulder on the interior of the valve casing, will draw the valve plug firmly to its seat and prevent the escape of the fluid pressure medium. The top of the valve plug 78 is provided with a squared boss 88 to receive a handle 92, which is secured in place by the usual nut engaging the threaded end of the valve spindle 89. Stop lugs 94 and 95, preferably in the form of threaded bolts tapped into the upper face of the valve casing, serve to limit the movement of the valve in both directions, as indicated in Fig. 2. Pipe 100 is connected with a pump, vacuum tank, or other suitable form of apparatus for effecting the necessary and desired reduction of pressure in the vacuum chamber 40, also for reducing the pressure on opposite sides of the piston 36 in cylinder 30 to effect reciprocation of the piston. Pipe 101 leads from valve casing 70 to the end of cylinder 30 closed by the head 32, the end of the pipe being tapped into a central port in said cylinder head 32. Pipe 102 connects the port 74 in the valve casing with the opposite end of cylinder 30, the end of said pipe being tapped into an opening in cylinder head 31. Pipe 103 connects port 75 of the valve casing with port 46 of the vacuum chamber 40. In each of the pipes 101, 102 and 103, there is preferably interposed a coupling member 101′, 102′ and 103′, respectively, which include suitably perforated and interchangeable washers which serve to reduce the effective diameters of the pipes, thereby regulating the rate of exhaustion of the air pressure in the vacuum chamber 40 and the respective ends of the cylinder 30.

The apparatus as thus far described is sufficient to effectively test and visually indicate the results of such tests of containers, the indication being produced by the movement of the pin 60 in the vacuum chamber, but it is preferred to provide the apparatus with audible indicating means to cooperate with the movement of the pin and, to this end, there is mounted on the end of the panel 1, by means of an insulator block 106, a spring contact arm 105 in the outer end of which is secured an adjustable contact screw 107, which is locked to the arm by suitable set nuts 108. The spring contact represented by the arm 105 and adjusting screw 107 is connected by a lead 109 with one terminal of an electric bell or buzzer 111, the other terminal of said bell or buzzer being connected to a lead 112, which is grounded at 114 on the vacuum chamber 40, said lead 112 including a battery 113.

Figure 10:
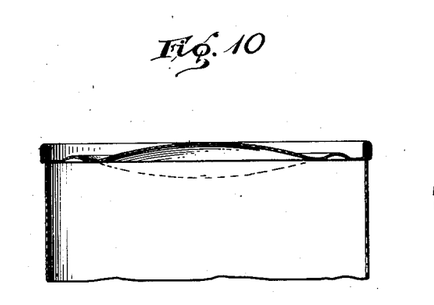
Figs. 10, 11, 12 and 13 illustrate typical receptacles or containers to the testing of which the invention is applicable.
Figure 11:
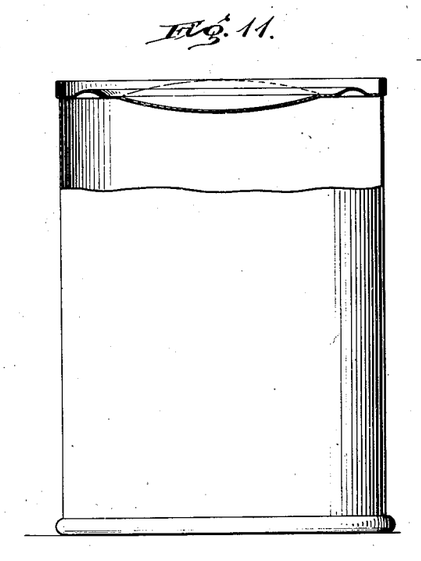
Figure 12:
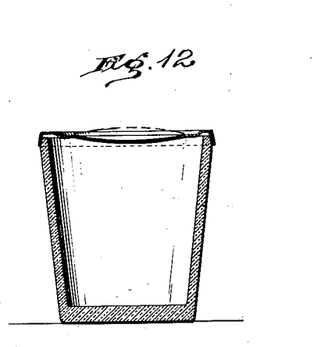

The particular machine illustrated is adapted to test the vacuum in containers, the end closures of which are moved a certain amount under the application of differential pressures within and without the container and such a container is illustrated in position in dotted lines in Fig. 1. The operation of the apparatus is as follows: It is to be assumed that the normal container being tested has an internal vacuum equal to 8 inches of mercury and that about 4 inches of applied vacuum to the head or end closure of the same would be necessary to cause the closure to move or "flip" from the normal concave relation such as shown in Fig. 11, to the convex relation shown in Fig. 10, if the pressure in the container was substantially equal to that of the atmosphere. In other words, if the container instead of having a vacuum therein of 8 inches of mercury had zero vacuum or atmospheric pressure, the closure "flips" or convexes upon the application of 4 inches or more of applied external vacuum, the pressure represented by the 4 inches of vacuum being that actually necessary to distort the metal of the closure. Therefore, the normal cover on a container having 8 inches of vacuum therein should "flip" at 4 plus 8 or 12 inches of external applied vacuum. If it is desired to select from a series of containers, normally having 8 inches of internal vacuum, all containers having zero vacuum or "leakers", about 2 or 3 inches of vacuum for variations in the metal of the can closure is allowed, so that, in order to separate the cans having zero vacuum, the degree of vacuum induced in the vacuum chamber 40 should be that represented by about 7 inches of mercury. The amount of vacuum required to "flip" the flexible portion of a container closure depends upon several factors, such as the thickness and kind of material, whether the same has been heat treated, the contour markings on its surface, and the effect of the impact of the contour marking dies. Simple experimental tests are required to determine the amount of vacuum required to "flip" each type of container closure on a container having zero vacuum therein. On the aforesaid assumption, it will require 15 inches of external applied vacuum to "flip" the closure on a container having a 8 inch normal internal vacuum. The closures on some containers may be of such a construction that they will not produce the hereinbefore described "flip", but will nevertheless move to an appreciable amount, when subjected to a vacuum or reduced fluid pressure externally applied and the apparatus will operate effectively even when the movement of the closure under the differential pressures is very slight.

The can or container is placed on the bracket 3 and the handle 92 of the valve 70 is moved to position A, indicated in Figs. 1 and 2. This establishes communication from pipe 100 through ports and passages 80, 81, 82 and 83 of valve 70 and pipe 102 to the end of cylinder 30 closed by head 31. At the same time, ports 84 and 85 vent the opposite end of the cylinder 30 through pipe 101 to the atmosphere, so that the piston is moved by a predominant atmospheric pressure below the reduced pressure on the opposite side thereof to force the plunger and the can engaged by the table 10 toward the left, as indicated in Figs. 1 and 2. The end closure of the can is forced into engagement with the inwardly tapered rim 41 on the face of the vacuum chamber 40 and some part of the surface of the can closure is forced into sealing relation with the rubber packing or gasket 42, effecting an air-tight seal between the can head and the vacuum chamber. At the same time, opposite portions of the can closure engage the projecting stems 50 of valves 51 and unseat the valves, which open up communication between the interior of the vacuum chamber 40 and the pressure reducing source as follows: from the interior of the vacuum chamber through ports 49, valve chambers 48, past the open valves 50 into duct or passageway 45, thence by port 46 and pipe 103 to port 80 of valve 70, which port is in communication with pipe 100. The pressure reducing means which communicates with pipe 100 withdraws the air from the vacuum chamber, thereby producing the desired degree of vacuum in the chamber and inasmuch as the latter is sealed to the top or closure of the can, this reduced fluid pressure is applied directly to the can top or closure. If the can or container has an internal vacuum of 8 inches or more, there is no visible effect and the can and its contents are accepted as normal. If the container, however, contains zero vacuum, or is a "leaker", the closure or cover "flips" or changes from a normal concave, or relatively flat position, to a convex position, as indicated in Fig. 10, the bulging movement of the closure bringing the latter into contact with the pin 60 and forcing the latter outwardly against the tension of its spring and making an electrical contact with the terminal screw 107, thereby completing the circuit to the bell 111 and giving an audible signal. After each container has been tested, it is removed from the machine by shifting the handle of valve 70 from position A to position B, which moves the valve to bring vent port 86 into registry with pipe 103 and opens up the vacuum chamber to the atmosphere. Simultaneously, the port 80 of the valve establishes communication between pipe 100 and pipe 101, thereby reducing the pressure in the front end of cylinder 30, and the opposite end of the cylinder is vented to the atmosphere by pipe 102 and ports 84 and 85 of valve 70, so that the predominant atmospheric pressure forces piston 36 to the right and withdraws the plunger, permitting the can to be manually removed. The removal of the can permits the valves 51 to be reseated by their springs and the pin 60 to return to its normal position and the apparatus is ready for the subsequent operations. By adjusting the cage 62 axially within the vacuum chamber, the end of pin 60, which engages the container closure, may be accurately positioned to be engaged by any predetermined movement of the closure in an outward direction and, obviously, the adjustment of the pin 60 may be properly compensated by suitable adjustment of the contact screw 107. The amount of clearance allowed between the outer end 60 and the end of contact screw 107 will depend upon the commerical variation in the manufacture of the containers, especially the closures therefor, the amount of fluid pressure applied to the vacuum chamber, the maximum movement of the flexing portion of the container, which movement may constitute a complete "flip" of the character hereinbefore indicated, or the mere outward movement or bulging of the container closure, as hereinbefore described. By adding to the amount of fluid pressure required to "flip" or move the flexible container closure, the amount of the internal fluid pressure of the container, and regulating the reduced fluid pressure supplied to the machine accordingly, any containers of this or a lower predetermined internal fluid pressure may be separated from those containing a higher internal fluid pressure. If the vacuum gauge 54 is employed and the fluid pressure withdrawn from the vacuum chamber gradually and the reading on the vacuum gauge be taken at the instant when the container closure "flips", which can be readily determined by the sound produced by the movement of the closure as well as the first audible note of the alarm bell 111, it is possible to ascertain the actual internal fluid pressure in the container by deducting the amount of fluid pressure required to effect the "flip" of the closure on a similar container having atmospheric pressure therein.

Figure 13:
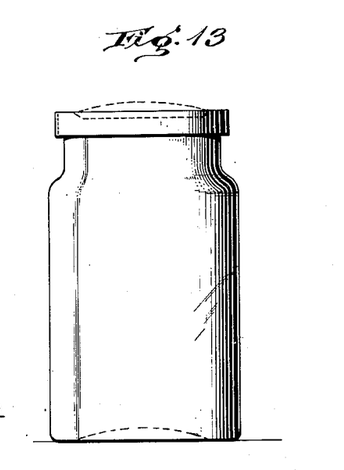

As indicated, the machine illustrated is merely typical and, obviously, is susceptible of various changes and modifications to accommodate containers of different types and forms, without departing from the spirit of the invention. For example, a machine of different size would be required for testing receptacles of the type shown in Fig. 13, than that required to operate with commercial cans of the type shown in Figs. 10 and 11, but the essential characteristics and mode of operation of the machine are not varied. Preferably, the testing of the containers is effected under normal atmospheric temperature conditions, or an average temperature of 65 degrees centigrade or under, of the containers and the contents thereof. The test may be effected prior or subsequent to the labeling of the containers, or previous to storage or shipment. The sealing ring 42 may be so proportioned as to engage any desired portion of the container closure, which is capable of effecting an air-tight seal with the ring and preferably the gasket will be made of such size to engage as near the periphery of the closure as possible. As the machine is a self-contained unit, it may be set up and operated in any desired position or relation, horizontal, vertical or inclined, without impairing its effectiveness.

In order to adjust the bearing pressure of the valve plug 78 against its seat 76 and maintain said pressure substantially constant irrespective of the vacuum used, there is provided a pin 96 slidably mounted in an externally threaded nipple 97, tapped through brackets 71, said pin being forced against the center of the bottom of the plug 78 by spring 98, which is confined between a flange on the pin and a sleeve 99' slidable in nipple 97 and adjustable to regulate the tension of the spring 98 by a nut 99 threaded on the nipple.

What I claim is:

1. A machine for testing the vacuum in sealed containers, comprising means for subjecting the containers to fluid pressure below atmospheric pressure, and means actuated by the movement of the walls of the containers under such reduced pressure to indicate vacuum deficiencies in said containers.

2. A machine for testing the vacuum in sealed containers having flexible sections normally concaved by the vacuum therein, comprising means whereby the pressure on the outer faces of the sections may be reduced to a point such that the sections of those containers only which have vacuum deficiencies will be moved outwardly, and indicating means actuated by the movement of the sections.

3. A machine for testing the vacuum in sealed containers having flexible closures, comprising means for applying a reduced air pressure to the exterior of the closures, and means operated by the movement of the closures to indicate the containers in which the degree of vacuum is less than that applied to the exterior of the closures.

4. A machine for testing the vacuum in sealed containers having flexible closures, comprising means for applying a reduced air pressure to the exterior of the closures, means for engaging the closures with the applying means in air-tight relation, and means operated by the movement of the closures to indicate the containers in which the degree of vacuum is less than that applied to the exterior of the closures.

5. A machine for testing the vacuum in sealed containers having a flexible section normally concaved by the vacuum, a chamber with which the container is engaged to bring the flexible section in air-tight engagement with the chamber, means for reducing the fluid pressure in said chamber, and means actuated by the movement of said flexible section to indicate containers in which the vacuum is deficient.

6. A machine for testing the vacuum in sealed containers having flexible closures, comprising a chamber, means for effecting a sealed joint between the chamber and the closures of said containers, means for reducing the air pressure in said chamber, and means operated by the movement of the closures to indicate the containers in which the vacuum is deficient.

7. A machine for testing the vacuum in sealed containers having flexible closures, comprising a chamber having an opening to receive the closure ends of the containers, means for effecting an air-tight joint between the chamber and the closures, means for reducing the air pressure in said chamber, and means operated by the movement of the closures to indicate the containers in which the vacuum is deficient.

8. A machine for testing the vacuum in sealed containers having flexible closures, comprising a chamber open at one end, a sealing ring surrounding the opening, an air duct in said chamber, a valve normally closing said duct and having a stem projecting beyond said sealing ring, a plunger to move the containers into engagement with the sealing ring and the valve stem, and means communicating with said duct for reducing the air pressure in said chamber when the valve is opened by the containers.

9. A machine for testing the vacuum in sealed containers having flexible closures, comprising a chamber open at one end, a sealing ring surrounding the opening, an air duct in said chamber, a valve normally closing said duct and having a stem projecting beyond said sealing ring, a plunger to move the containers into engagement with the sealing ring and the valve stem, means communicating with said duct for reducing the air pressure in said chamber when the valve is opened by the containers, and a rod slidably mounted in the chamber with one end adapted to be engaged by the container closure under movement of the latter and the other end extending beyond said chamber.

10. A machine for testing the vacuum in sealed containers having flexible closures, comprising a chamber open at one end, a sealing ring surrounding the opening, an air duct in said chamber, a valve normally closing said duct and having a stem projecting beyond said sealing ring, a plunger to move the containers into engagement with the sealing ring and the valve stem, means communicating with said duct for reducing the air pressure in said chamber when the valve is opened by the containers, a rod slidably mounted in the chamber with one end adapted to be engaged by the container closure under movement of the latter and the other end extending beyond said chamber, and indicating means actuated by said rod.

11. A machine for testing the vacuum in sealed containers having flexible closures, comprising a chamber open at one end, a sealing ring surrounding the opening, an air duct in said chamber, a valve normally closing said duct and having a stem projecting beyond said sealing ring, a plunger to move the containers into engagement with the sealing ring and the valve stem, means communicating with said duct for reducing the air pressure in said chamber when the valve is opened by the containers, a rod slidably mounted in said chamber with one end adapted to be engaged by the container closure under movement of the latter and the other end extending beyond said chamber, and electrically actuated indicating means operated by said rod.

In testimony whereof I affix my signature.

FRANCIS H. LANDRUM.